April 10, 1956 A. VERHOEFF ET AL 2,741,260
AUTOMATIC DEVICE FOR PREVENTING UNWANTED OUTFLOW
OF GASES FROM ONE SPACE TO ANOTHER
Filed June 12, 1952
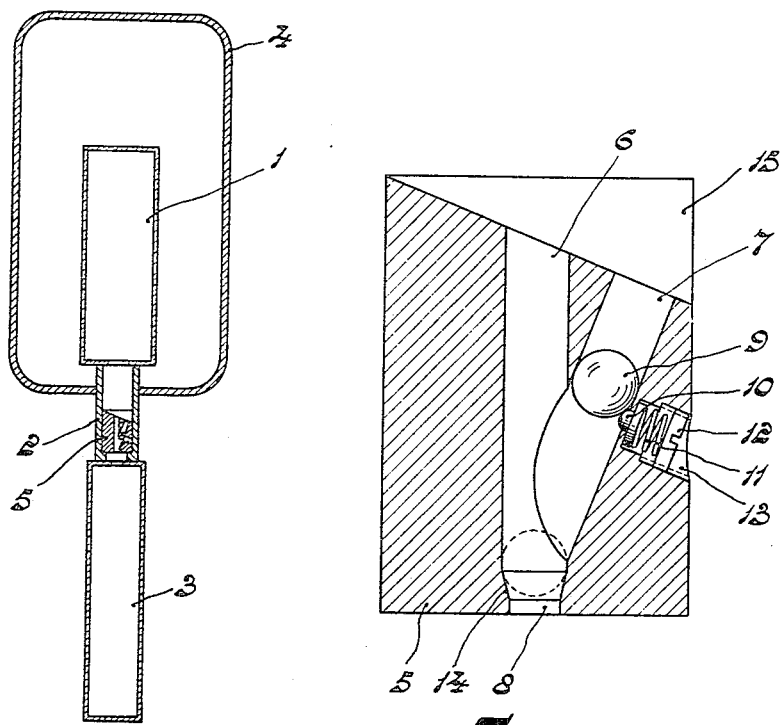
INVENTORS
Wopke De Vries
Adrianus Verhoeff
BY Fred M Vogel
AGENT

United States Patent Office 2,741,260
Patented Apr. 10, 1956

2,741,260

AUTOMATIC DEVICE FOR PREVENTING UNWANTED OUTFLOW OF GASES FROM ONE SPACE TO ANOTHER

Adrianus Verhoeff and Wopke de Vries, Eindhoven, Netherlands, assignors to Hartford National Bank and Trust Company, Hartford, Conn., as trustee Application June 12, 1952, Serial No. 293,058

Claims priority, application Netherlands June 27, 1951

4 Claims. (Cl. 137—460)

This invention relates to automatic devices for preventing unwanted overflow of gases from one space to another, which spaces are in direct communication during operation. Such devices, which act as emergency shutters, are used for example in gauge glasses of steam boilers and prevent steam from escaping from the boiler in case of breakage of the gauge glass. They may also be used, for example, in gas cylinders in which it is necessary to ensure that the gases contained in the cylinder and which in most cases are under high pressure do not escape when the reducing device or the shutter which in most cases is provided becomes defective. The invention is also applicable to some electro-technical devices such as electron-microscopes. For such microscopes use may be made of a construction constituted by a glass vessel and a metallic vessel which are in free communication with one another and both of which are exhausted. The glass vessel is surrounded by a space in which a high pressure exists. If the glass vessel implodes, there is a great possibility that the penetrating gases take along glass particles which may find their way into the interior of the microscope and thus cause damage. Fnally the invention is applicable to exhausting devices.

The invention is characterized in that an automatically operating device of the above-mentioned kind comprises a communication member between the two spaces, which on the side of the space from which gases may flow over comprises two ducts which meet in the communication member at an angle smaller than 90°, whereas on the side of the other space a third duct is provided in the communication channel, one duct of the two meeting ducts, together with the third duct, constituting the direct and free communication between the two spaces, and the second duct being closed by a spherical member which is movable in the duct and which is locked in its rest position so far as the difference in pressure between the gases in the two spaces does not exceed a predetermined value, whereas upon occurrence of such a difference in pressure the spherical member is released by the locking device, thus closing the third duct.

In one embodiment of the invention, the locking device is constituted by a pawl which is subject to the action of a spring.

In one embodiment of the invention, the device is preferably so constructed that the centre lines of the first and the third duct coincide and the third duct, at least in part, has a diameter smaller than that of the second duct. A device of this form affords the advantage that the manufacture is simple, since the ducts may be provided by a simple drilling operation.

It is advantageous if, in another embodiment of the invention, the boundary surface of the communication member on the side of the space from which gases may flow over has a groove which is inclined with respect to the said boundary surface and into which both the first and the second duct open and of which the deepest point is adjacent the debouchement of the second duct, the width of the groove preferably being equal to the diameter of the spherical member. In this embodiment of the invention it is possible for the spherical member to be moved again into the second duct by removing the vessel to be protected and subsequent by lifting the member by means of a rod-like object.

In order that the invention may be readily carried into effect, one example will now be described in detail with reference to the accompanying drawings in which part of an electron-microscope is shown and in which:

Fig. 1 shows three spaces, the communication between two of the spaces including an automatically-operating device according to the invention and Fig. 2 shows the automatically-operating device on an enlarged scale.

A glass vessel 1 communicates with the use of a communication piece 2 with a metallic vessel 3. The vessels 1 and 2, which are in free and direct communication with one another, are both exhausted. The vessel 1 is enclosed by a metallic vessel 4, in which a super pressure of, for example, 10 atmospheres prevails. The communication piece 2 includes a member 5, which on the side of the vessel 1 exhibits two ducts 6 and 7, which meet at certain angle. A third duct 8 is provided of which the centre line coincides with that of the duct 6. A ball 9 is provided in the duct 7. The ball 9 is locked with the use of a pawl 10, which is subject to the action of a spring 11. The latter is compressed by a pressure piece 12, which is threaded and which fits into an aperture 13 which is also threaded. The member 5 furthermore comprises a groove 15, into which the ducts 6 and 7 open and of which the width is equal to the diameter of the ball 9. The operation of the device is as follows:

When the vessel 1 implodes, the gases contained in the vessel 4 and which are under high pressure flow through the ducts 6 and 8 to the interior of the vessel 3. In this case there is a risk of glass particles being taken along. Furthermore, the vessel 3 cannot resist such a high pressure. Due to the high pressure which suddenly prevails in the vessel 1, the ball 9 is urged into the duct 8, since the pawl 10 is then pushed away against the action of the spring. This movement of the ball 9 is furthermore supported in that underpressure occurs under the ball 9 due to the rapid flow of the gas in the ducts 6 and 8. The ball finally comes at rest in a seat 14 provided in the duct 8, thus closing the direct and free communication between the vessels 1 and 3. When the ball 9 is required to be moved again into the duct 7, this may be effected by loosening the connection between vessel 3 and member 5 and pushing the ball in the duct 6 upwards with the use of a pin. As soon as the ball has reached groove 15 and is free from the duct 6, it rolls over the inclined surface and into the duct 7.

What we claim is:

1. A device for automatically preventing the overflow of gases from one space formed in a first body to another space formed in a second body, said spaces being in direct communication with each other during the flow of gas therebetween below a predetermined value comprising: a member connecting said two spaces, a first and second duct in said member each having one end opening into one of said spaces, said ducts being positioned angularly relative to each other, a third duct in said member having one end opening into the other of said spaces and the other ends of each of said ducts being connected together thereby forming a junction region, said second duct having a closure means comprising a spherical member and a resilient locking means, said first and third ducts being substantially vertical and said second duct being inclined at an acute angle to said first duct, a part of said third duct forming a valve seat for said spherical member, said locking means being located between said spherical member and said junction region and being operative to secure said spherical member in said second duct during the flow of gas between said spaces below a predetermined value and to release said spherical member when said flow of gas from said one space to said other space exceeds said predetermined value to thereby cause said spherical member to form a closure for said third duct.

2. A device as set forth in claim 1 wherein said locking means comprises a pawl and a compression spring, said spring urging said pawl into engagement with said spherical member.

3. A device as set forth in claim 1 wherein said first and third ducts are positioned co-axially relative to each other, and said part of said duct having a diameter smaller than the diameter of said second duct.

4. A device for automatically preventing the overflow of gases from one space formed in a first body to another space formed in a second body, said spaces being in direct communication with each oher during the flow of gas therebetween below a pretermined value comprising: a member connecting said two spaces, a first and second duct in said member each having one end opening into one of said spaces, said ducts being positioned angularly relative to each other, a third duct in said member having one end opening into the other of said spaces and the other ends of each of said ducts being connected together thereby forming a junction region, said first and third ducts being substantially vertical and co-extensive with each other, the boundary surface of said member adjacent to said one of said spaces being inclined and the opening of said second duct being positioned lower on said incline than the opening of said first duct, said second duct having a closure means comprising a spherical member and a resilient locking means, a part of said third duct forming a valve seat for said spherical member, said inclined boundary surface forming a path for said spherical member and said locking means being located between said spherical member and said junction region and being operative to secure said spherical member in said second duct during the flow of gas between said spaces below a predetermined value and to release said spherical member when said flow of gas from said one space to said other space exceeds said predetermined value to thereby cause said spherical member to form a closure for said third duct.

References Cited in the file of this patent

UNITED STATES PATENTS

| | | |
|---|---|---|
| 1,518,461 | Smith | Dec. 9, 1924 |
| 1,770,912 | Clapp | July 22, 1930 |
| 2,638,308 | Kell | May 12, 1953 |